Patented Nov. 2, 1948

2,452,895

UNITED STATES PATENT OFFICE 2,452,895

LINEAR SILMETHYLENESILOXANE

Ben A. Bluestein, Schenectady, N. Y., assignor to General Electric Company, a corporation of New York No Drawing. Application January 22, 1948, Serial No. 3,812

4 Claims. (Cl. 260—448.2)

This invention is concerned with novel compounds of silicon. More particularly, the invention relates to new hydrocarbon-substituted silmethylenesiloxanes corresponding to the general formula

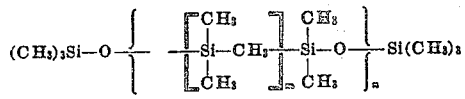

where $n$ and $m$ are each whole numbers equal to one of the following: 1, 2.

The compounds of this invention have utility as intermediates in the preparation of other chemical compounds and polymers. These compounds may also be employed for lubricating purposes and as anti-foaming agents. In addition, under suitable conditions of reaction, the claimed compositions of matter may be converted to higher molecular weight liquid or elastic polymeric materials which may be employed in the preparation of novel synthetic resins and rubbers.

The following examples are illustrative of procedures whereby my claimed compositions of matter may be prepared. It will, of course, be apparent to those skilled in the art that other methods may be employed in preparing these novel compounds.

EXAMPLE 1

A solution of 540 cc. (2.5 mols) monochloromethylpentamethyldisiloxane

[(CH₃)₃SiOSi(CH₃)₂CH₂Cl]

in 500 cc. anhydrous ethyl ether was added slowly to 65 grams (2.8 mols) magnesium and 50 cc. dry ethyl ether. The desired reaction between the ingredients was initiated by a crystal of iodine. The addition took place over a two-hour period. The mixture was heated at reflux temperature for 15 minutes after the addition was complete. Thereafter, 145 cc. (1.2 mols) dimethyldichlorosilane was added during a ½ hour period and the mass was heated at its reflux temperature for about 2½ hours. The contents of the reaction vessel were poured onto about 2 kg. cracked ice and water. the ether layer separated and washed three times with water and dried over anhydrous Na₂SO₄. The resulting colorless liquid was distilled through a Vigreaux column to remove the ether and other materials boiling below 105° C. The residue was then rapidly distilled at 50 mm. to a temperature of 235° C. and the distillate carefully fractionally distilled to yield the following chemical compounds having the stipulated physical properties:

*Table 1*

| Compound | B. P. °C. | $d_4^{20}$ | $n_D^{20}$ | Molar Refractivity | |
|---|---|---|---|---|---|
| | | | | Found | Calc. |
| 1 [1] | 96.5-7.5/51 mm.<br>178-80/760 mm. | 0.8081 | 1.4137 | 72.43 | 72.56 |
| 2 [2] | 130-2/54 mm. | 0.8447 | 1.4121 | 90.92 | 91.19 |
| 3 [3] | 175-7/55 mm. | 0.8550 | 1.4276 | 114.46 | 114.79 |

[1] 2,2,4,4,6,6-hexamethyl-3-oxa-2,4,6-trisilaheptane having the formula

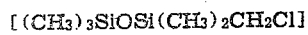

[2] Bis-(pentamethyldisiloxanyl) methane or 2,2,4,4,6,6,8,8-octamethyl-3,7-dioxa-2,4,6,8-tetrasilanonane corresponding to the formula

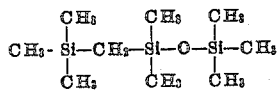

[3] Dimethyl-bis-(pentamethyldisiloxanylmethyl) silane or 2,2,4,4,6,6,8,8,10,10-decamethyl-3,9-dioxa-2,4,6,8,10-pentasilaundecane corresponding to the formula

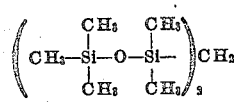

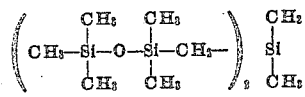

Analysis of the aforementioned compounds showed them to contain the following per cents of carbon and hydrogen:

*Table 2*

| Compound | Per Cent Hydrogen | | Per Cent Carbon | |
|---|---|---|---|---|
| | Found | Calc. | Found | Calc. |
| 1 | 46.60 | 46.10 | 11.20 | 11.18 |
| 2 | 43.10 | 42.81 | 10.60 | 10.45 |
| 3 | 44.90 | 44.17 | 10.80 | 10.59 |

EXAMPLE 2

In this example, the exact ingredients and procedure employed in Example 1 were employed with the exception that after the addition of the dimethyldichlorosilane the refluxing of the mixture was conducted for a 19-hour period instead of the 2½-hour period disclosed in Example 1. Thereafter, the reaction mixture was hydrolyzed, washed and dried in the same manner as was done in Example 1. The ether and low boiling fractions (below 105° C.) were removed and the residue fractionally distilled to yield a fraction boiling between about 118° C. to about 130° C. at approximately 52–54 mm. This fraction, which was believed to comprise an azeotropic mixture of bis-(pentamethyldisiloxanyl)methane and 2,2,4,4,6-pentamethyl-3-oxa-6-hydroxy - 2,4,6 - trisilaheptane having the formula

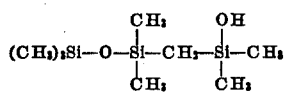

was heated at reflux temperature for about 3 hours and thereafter fractionally distilled to yield tetramethyl - 1,3 - bis - (pentamethyldisiloxanylmethyl) disiloxane or 2,2,4,4,6,6,8,8,10,10,12,12-dodecamethyl - 3,7,11 - trioxa-2,4,6,8,10,12-hexasilatridecane corresponding to the formula

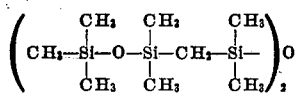

Analysis of this compound showed it to contain contain 42.70 per cent carbon (calc. 42.25% and 10.30 percent hydrogen (calc. 10.20%). This compound has the following properties:

B. P., 184–5° C./34 mm.
$d_4^{20}$ 0.8725
$n_D^{20}$ 1.4243
Molar refractivity, 133.09 (calc. 133.44)

Example 3

The compound 2,2,4,4,6,6,8,8,10,10,12,12,14,14,-16,16 - hexadecamethyl - 3,9,15-trioxa-2,4,6,8,10,-12,14,16-octasilaheptadecane having the formula

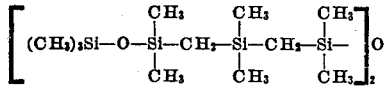

may be prepared by treating dimethyl-bis-(pentamethyldisiloxanylmethyl) silane with concentrated sulphuric acid, diluting the mixture with water, separating and washing the organic layer with water, and drying and fractionally distilling the dried organic residue.

What I claim as new and desire to secure by Letters Patent of the United States is:

1. Chemical compounds corresponding to the general formula

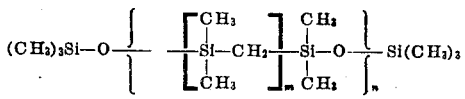

where $m$ and $n$ are each a whole number equal to from 1 to 2.

2. 2,2,4,4,6,6,8,8, - octamethyl - 3,7-dioxa-2,4,6,8-tetrasilanonane corresponding to the formula

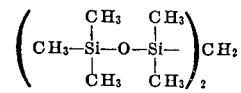

3. 2,2,4,4,6,6,8,8,10,10 - decamethyl-3,9-dioxa-2,-4,6,8,10-pentasilaundecane corresponding to the formula

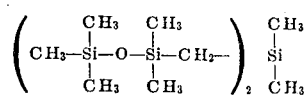

4. 2,2,4,4,6,6,8,8,10,10,12,12 - dodecamethyl-3,7-11 - trioxa - 2,4,6,8,10,12-hexasilatridecane corresponding to the formula

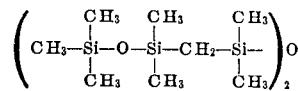

BEN A. BLUESTEIN.

REFERENCES CITED

The following references are of record in the file of this patent:

UNITED STATES PATENTS

| Number | Name | Date |
|---|---|---|
| 2,444,858 | Spier | July 6, 1948 |

OTHER REFERENCES

Goodwin, "JACS," vol. 69 (1947), page 2247.
Sommer, "JACS," vol. 69 (1937), page 980.